United States Patent [19]
Itoh

[11] Patent Number: 4,797,903
[45] Date of Patent: Jan. 10, 1989

[54] CHANNEL SWITCHING SYSTEM WITHOUT INSTANTANEOUS SIGNAL LOSS

[75] Inventor: Hideaki Itoh, Chofu, Japan

[73] Assignee: Fujitsu Limited, Kawasaki, Japan

[21] Appl. No.: 51,640

[22] Filed: May 20, 1987

[30] Foreign Application Priority Data

May 23, 1986 [JP] Japan .............................. 61-118509

[51] Int. Cl.⁴ .......................................... H04B 7/02
[52] U.S. Cl. ..................... 375/40; 375/100; 455/59; 455/133; 371/8
[58] Field of Search ............... 371/8, 68; 340/825.01; 375/40, 100; 455/52, 59, 133, 134, 135, 136

[56] References Cited

U.S. PATENT DOCUMENTS

| 4,246,656 | 1/1981 | Wood et al. | 455/136 |
| 4,551,845 | 11/1985 | Halden et al. | 340/825.01 |
| 4,686,675 | 8/1987 | Morimoto et al. | 340/825.01 |

FOREIGN PATENT DOCUMENTS

57-058419 4/1982 Japan .

Primary Examiner—Benedict V. Safourek
Attorney, Agent, or Firm—Staas & Halsey

[57] ABSTRACT

A channel switching system without an instantaneous signal loss in a data communication system such as a digital microwave multiple radio communication system. The channel switching system includes a control unit for generating a switching control signal in response to a fault detecting circuit; a unit for receiving a phase adjustment signal from the active receiver unit of an active transmission channel and another signal from the standby receiver, for adjusting the phases between both received signals in response to the switching control signal, and for outputting a switch energizing signal; a high speed switching unit, including a unipolar high speed switching circuit, for switching signals from the phase adjustment unit in response to the switch energizing signal. The switching system further includes a compulsory switching unit, for compulsorily switching the signals supplied to the switching unit.

The phase adjustment unit outputs the switch energizing signal to the unipolar switching circuit when a phase coincidence is obtained before a predetermined time, so that the unipolar switching circuit outputs the phase-adjusted signal.

The compulsory switching unit energizes the unipolar switching circuit, when the phase coincidence is not obtained during the predetermined time, to output one signal in response to the switch energizing signal.

18 Claims, 5 Drawing Sheets

Fig.6a SSWC1

Fig.6b PHASE ADJUST

Fig.6c STPD

Fig.6d STM1

Fig.6e STM2

Fig.6f SSWE1

Fig.6g SSWR

Fig.6h OUT DATA

CHANNEL SWITCHING SYSTEM WITHOUT INSTANTANEOUS SIGNAL LOSS

BACKGROUND OF THE INVENTION

1. Field of the Invention

The present invention relates to a communication system. More particularly, it relates to an improved channel switching system without instantaneous signal loss during switching between an active transmission channel and a standby transmission channel in a communication system.

2. Description of the Related Art

In a communication system such as a digital microwave multiple radio communication system, a standby transmission channel is provided in addition to active transmission channels to switch thereto from the active transmission channel in which deterioration of a transmission performance (quality) due to fading or a fault due to, for example, a fault in a radio communication apparatus, i.e. a transmitter and/or a receiver. Accordingly, a channel switching system is provided in each active transmission channel, to enable a switch-over between the active transmission channel and the standby transmission channel.

In a prior art, a mercury coaxial relay is used for the switching means. The mercury coaxial relay has an advantage of providing excellent isolation between the active transmission channel and the standby transmission channel, while maintaining a low signal leakage therebetween. The mercury coaxial relay also prevents the generation of a mismatch of impedances on the transmission channels and has the high reliability. However, the mercury coaxial relay has a disadvantage of a low speed operation time, for example, several milliseconds, and the contacts thereof are fully open for a short period during switching. As a result, an instantaneous signal loss cannot be avoided. In addition, the switching is carried out unconditionally. In other words, a phase synchronization between the active transmission channel and the standby transmission channel cannot be made, and accordingly, a burden of frame synchronization at a carrier terminal connected to the channel switching system is increased. Therefore, until the phase is adjusted, an actual signal loss of approximately several hundreds milliseconds may occur.

Japanese Patent Publication No. 57-58419, entitled "A Transmission Line Switching System Without Instantaneous Loss", and published on Apr. 4, 1982, solves the above defects by providing a high speed switching means, such as a semiconductor switch, in addition to the mercury relay, and employs a phase pattern matching and adjustment procedure prior to the channel switching. The operation of the switching system will be described later in detail with reference to the drawings.

The switching system achieves a good switching operation with regard to combatting fading, but suffers from the following defects. First, when a device in the active transmission channel malfunctions, signals on the active transmission channel are eliminated, and accordingly, the pattern matching and phase adjustment of signals between the active transmission channel and the standby transmission channel cannot be performed satisfactorily, thus disabling the channel switching by the high speed switching means. At this time, channel switching by the mercury relay can be attempted, and when the active transmission channel is restored, a channel switch-back from the standby transmission channel to the active transmission channel can be achieved by the mercury relay. However, at this time, an instantaneous signal loss occurs to cause an out of phase signal at the carrier terminal, as in the above prior art. Second, when the standby transmission channel malfunctions after the channel is switched from the active transmission channel to the standby transmission channel by the high speed switching means, signals on the standby transmission channel are eliminated. If the active transmission channel is restored in this condition, signal patterns therebetween do not coincide. As a result, a channel switching-back from the standby transmission channel to the active transmission channel cannot be carried out, and thus the channel malfunction state continues.

SUMMARY OF THE INVENTION

An object of the present invention is to provide an improved channel switching system without instantaneous signal loss, overcoming the above defects.

Another object of the present invention is to provide an improved channel switching system without instantaneous signal loss, which can be achieved by a simple circuit construction.

According to the present invention, there is provided a channel switching system of a data communication system including, a standby transmission channel having a standby receiver at an end and a standby transmitter at another end, and an active transmission channel having an active receiver at an end containing the channel switching system and a circuit for detecting a malfunction and a recovery of the active transmission channel, and an active transmitter unit at another end capable of transmitting a same signal therefrom through the standby transmitter. The channel switching system includes a control unit for generating a switching control signal in response to the fault detecting circuit, a phase adjustment unit, operatively connected to the switching control signal generating unit, for receiving a signal from the active receiver unit and another signal from the standby receiver, for adjusting phases between both received signals in response to the switching control signal, and for outputting a switch energizing signal, a high-speed switching unit, operatively connected to the phase adjustment unit, including a unipolar high speed switching circuit, for switching signals from the phase adjustment unit in response to he switch energizing signal, and a compulsory switching unit, operatively connected to the phase adjustment unit, for compulsorily switching the signals supplied to the phase adjustment unit. The phase adjustment unit adjusts a phase of one received signal to a phase of another received signal in response to the switching control signal. The phase adjustment unit outputs the switch energizing signal to the unipolar switching unit when a phase coincidence is obtained before a predetermined time lapse from an output of the switching control signal so that the unipolar switching unit outputs the phase-adjusted signal in response to the switching energizing signal. The compulsory switching unit energizes the unipolar switching unit, when the phase coincidence is not obtained during the predetermined time, to output one signal in response to the switch energizing signal.

The phase adjustment unit may include a first memory, a first memory control circuit operatively connected to the first memory and receiving the signal from the active receiver unit, a second memory, a second memory control circuit operatively connected to the second memory and receiving the signal from the standby receiver, and a pattern comparison circuit operatively connected to the first and second memory control circuits. The pattern comparison circuit receives data from the first and second memories, compares both received data in response to the reception of the switch control signal, controls one of the first and second memory control circuits, defined by a signal level of the switch control signal, to output shifted data from the memory corresponding to the controlled memory control circuit until both data from the first and second memories coincide during the predetermined time.

The phase adjustment unit may adjust a phase of the standby signal with a phase of the active signal when the switching control signal is changed from one level to another level, and output the switch energizing signal indicating a selection of the standby signal to the unipolar switching unit after a phase coincidence, or vice versa.

The unipolar switching unit may comprise a first AND gate receiving the standby signal and an inverted switching control signal and a second AND gate receiving the active signal and the switching control signal.

The compulsory switching unit may supply the same special pattern data to the phase adjustment unit and move the signals from the standby receiver and the active receiver unit to the phase adjustment unit when the phase coincidence is not obtained during the predetermined time, so that a phase coincidence for the same data is obtained to switch the signal at the unipolar switch unit. The compulsory switching unit may restore the signals from the standby receiver and the active receiver unit to be supplied to the phase adjustment unit after completion of the switching at the unipolar switch unit.

The compulsory switching unit may comprise a first switching circuit receiving the active signal and the special pattern data, a second switching circuit receiving the standby signal and the special pattern data, and a selection control circuit. The selection control circuit may control the first and second switch circuits to output the special pattern data from the first and second switching circuits when the predetermined time has elapsed and until the phase coincidence is obtained.

Preferably, the first and second switching circuits may include unipolar high speed switch circuits.

The channel switching system may further include a bipolar switch. The control unit may energize the bipolar switch when a second predetermined time has elapsed after a lapse of the predetermined time to output, through the bipolar switch, the standby signal when the active transmission channel is faulty, or the active signal when the active transmission channel is restored.

BRIEF DESCRIPTION OF THE DRAWINGS

Other objects and features of the present invention will be described below in detail with reference to the accompanying drawings, in which.

DESCRIPTION OF THE PREFERRED EMBODIMENTS

Before describing the preferred embodiments of the present invention, an example of a prior art system is described with reference to the drawings, for comparison.

Figure 1:
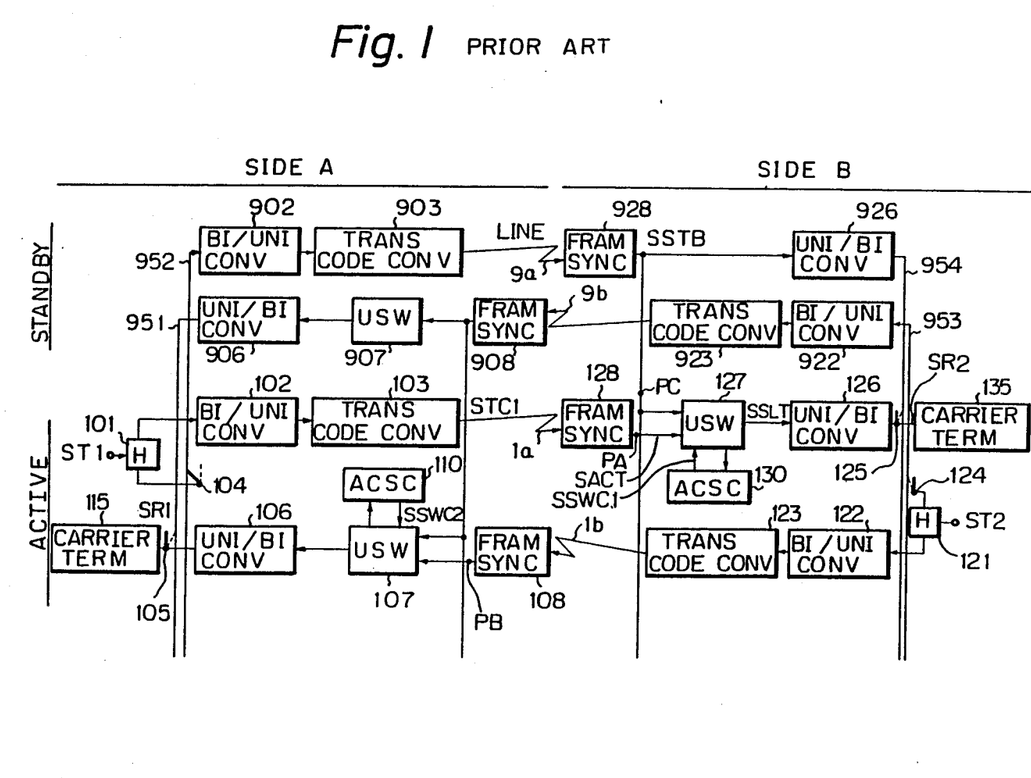
FIG. 1 is a block diagram of a prior art digital microwave multiple radio communication system.

In FIG. 1, a digital microwave multiple radio communication system includes an active transmission system and a standby transmision system. A plurality of active transmission systems can be provided therein, but only a single active transmission is illustrated for a simplification of the drawing.

The active transmission system includes two way channels. A channel includes a transmitter at side A having a hybrid circuit 101, a bipolar-to-unipolar converter 102, a transmission code converter 103, a bipolar switch 104, typically a mercury relay having a low speed switching time but providing a high isolation, and an automatic channel switching circuit 110. The channel also includes a receiver at side B having a frame synchronizer 128, a unipolar switch circuit 127, a unipolar-to-bipolar converter 126, a bipolar switch 125 identical to the bipolar switch 104, and an automatic channel switching circuit 130. The transmitter and the receiver are connected through a communication line 1a. At side B, a carrier terminal 135 is connected to the unipolar-to-bipolar converter 126. Another channel also includes a transmitter at side B similar to the transmitter at side A, a receiver at side A similar to the receiver at side B, and a communication line 1b connecting therebetween. A carrier terminal 115 is also connected to a unipolar-to-bipolar converter 106.

Each unipolar switch circuit 127 or 107 includes a unipole switch, i.e., a semiconductor switch or a switching gate circuit.

The standby transmission system also includes two way channels. A channel includes a transmitter at side A having a bipolar-to-unipolar converter 902 and a transmission code converter 903, a receiver at side B having a frame synchronizer 928 and a unipolar-to-bipolar converter 926, and a communication line 9a. Another channel also includes a transmitter at side B similar to the transmitter at side A, a receiver at side A similar to the receiver at side B, and a communication line 9b.

In a normal operation of the channel of the active transmission system, a transmission signal ST1 applied to the hybrid circuit 101 is supplied to only the bipolar-to-unipolar converter 102. The bipolar switch 104 is in the open condition as shown by a broken line. A transmission coded signal STC1 coded at the transmission code converter 103 is transmitted to the frame synchronizer 128 through the line 1a. The transmission coded signal STC1 is frame-synchronized at the frame synchronizer 128 and is further supplied to the unipolar switch circuit 127. The unipolar switch in the unipolar switch circuit 127 selects an active signal SACT from the frame synchronizer 128. The selected signal SSLT is then supplied to the unipolar-to-bipolar converter 126. The bipolar switch 125 is also in an open condition as shown by a solid line. Subsequently, a received signal SR2 from the unipolar-to-bipolar converter 126 is supplied to the carrier terminal 135. The above operation is controlled by the automatic channel switching circuits 110 and 130.

A normal operation of another channel of the active transmission system is substantially the same as the above operation.

An abnormal operation will be described with refeeence to FIG. 2.

Figure 2:
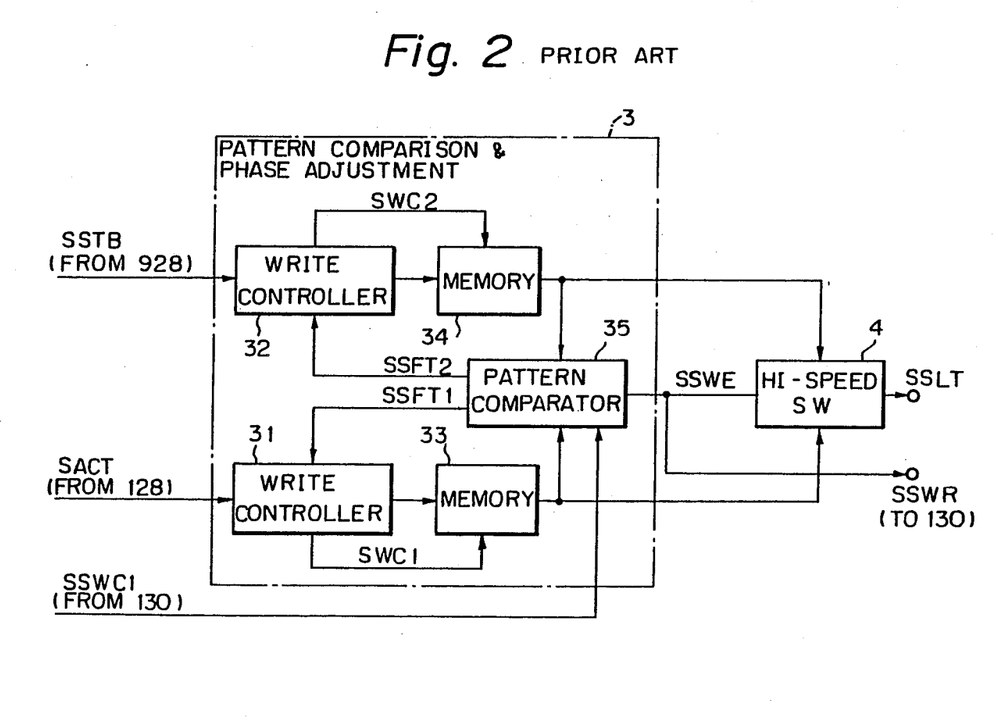
FIG. 2 is a circuit diagram of a unipolar switching circuit shown in FIG. 1.

FIG. 2 is a circuit diagram of the prior art unipolar switch circuit 127. The unipolar switch circuit 127 includes a pattern comparison and phase adjustment circuit 3 and a high speed switch circuit 4. The pattern comparison and phase adjustment circuit 3 includes a write controller 31 receiving the active signal SACT from the frame synchronizer 128, and a memory 33 connected to the write controller 31 and storing the active signal SACT in response to a write control signal SWC1 from the write controller 31. The pattern comparison and phase adjustment circuit 3 also includes another write controller 32 receiving a standby signal SSTB from the frame synchronizer 928, and another memory 34 connected to the write controller 32 and storing the standby signal SSTB in response to another write control signal SWC2. The pattern comparison and phase adjustment circuit 3 further includes a pattern comparator 35 receiving both data from the memories 33 and 34, making a comparison therebetween in response to a switch control signal SSWC1 from the automatic channel switching circuit 130, and outputting a switching energizing signal SSWE to the high speed switch circuit 4 when both data coincide. On the other hand, when both data in the pattern comparator 35 do not coincide, the pattern comparator 35 outputs a shift signal SSFT2 to the write controller 31 if the switch control signal SSWC1 is high level, so that the data from the memory 34 is phase-adjusted to the data from the memory 33. This shift signal SSFT2 is a command for outputting data shifted by one bit from the memory 34. After one bit is shifted for the data from the memory 34, the pattern comparison is again carried out. This operation can be carried out until both data coincide, but only for a predetermined time. If the switch control signal SSWC1 is low level, the above phase adjustment can be reversely carried out.

The high speed switch circuit 4 includes a high speed operation unipolar switch, i.e., a semiconductor switch. Upon receipt of the high level switch energizing signal SSWE, the high speed switch circuit 4 outputs the data from the memory 34. On the other hand, the high speed switch circuit 4 outputs the data from the memory 33 when the switch energizing signal SSWE is low level.

Referring to FIG. 1, when a channel malfunction of the active transmission channel is detected at a point PA through an output of the frame synchronizer 128, by a detector (not shown), fault information is sent to the automatic channel switching circuit 130. The automatic channel switching circuit 130, first, confirms that the standby transmission system is active and available for a new channel switching, then sends a "transmission parallel" signal to the active receiver at side A through the transmitter at side B and the line 1b, and simultaneously, sends the switching control signal SSWC1 to the pattern comparison and phase adjustment circuit 3 of the unipolar switch circuit 127.

Upon receipt of the transmission parallel signal, the automatic channel switching circuit 110 at side A energizes the bipolar switch 104 connecting it to a line 952 connected to the bipolar-to-unipolar converter 902 in the standby transmission system, as shown by a solid line. As a result, the same data are transmitted from the transmission code converters 103 and 903. But, in general, as both transmission (or propagation) paths are different, a signal received at the frame synchronizer 128 differs in phase from a signal received at the frame synchronizer 928. Accordingly, the pattern comparison and phase adjustment circuit 3 shown in FIG. 2, which was already energized for channel-switching the high speed switch circuit 4, receives the standby signal SSTB and the active signal SACT, compares the signals, and adjusts the standby data SSTB from the memory 34 against the active data SACT from the memory 33 by shifting one bit at a time. When a coincidence therebetween is obtained, the pattern comparator 35 sends the logical "1" switch energizing signal SSWE, to select the data from the memory 34, i.e., the phase adjusted standby signal The pattern comparator 35 also sends a switching response signal SSWR to the automatic channel switching circuit 130, notifying a completion of the switching operation.

The above switching can be achieved by using the high speed switch after the phase adjustment, and thus a channel switching without instantaneous signal loss is realized.

If a fault is detected at a point PB in the receiver at side A in the active transmission system, a similar operation can be carried out. Another transmission channel of the standby transmission system, including the circuits 922, 923, 9b, 908, 907, and 906, enables a data transmission thereby, instead of through the faulty transmission channel of the active transmission system.

When the transmission channel of the active transmission system, including the fault point PA, is restored, the pattern comparison and phase adjustment circuit 3 operates in response to a change of the switch control signal SSWC1 from the automatic channel switching circuit 130 to low level, phase-adjusting the active data from the memory 33 with the standby data from the memory 34, and then switching-back the channel from the standby transmission channel to the active transmission channel. This operation is also effected without instantaneous signal loss.

The above high speed switching under the phase coincidence effectively 14 achieves a switching without signal loss when the fault is fading. Fading means a deterioration of a transmission quality that slowly decreases with a lapse of time. When the deterioration reaches a predetermined level, the automatic channel switching circuit starts the pattern comparison and phase adjustment. In this condition, a satisfactory condition (time) for pattern comparison and phase adjustment is obtained.

Note, even if the pattern comparison and phase adjustment cannot be obtained for the predetermined time, the channel switching can be carried out by the bipolar switch 125.

However, the switching system suffers from the following defects.

First, when a device in the active transmission channel malfunctions, signals on the active transmission channel are eliminated, and accordingly, the pattern comparison and phase adjustment for the signals between the active transmission channel and the standby transmission channel cannot be satisfactorily performed, disenabling the channel switching by the high speed switching circuit. Accordingly, the channel switching by the bipolar switch can be attempted. When the active transmission channel is restored, the channel switch-back from the standby transmission channel to the active transmission channel can be achieved by the bipolar switch. At this time, an instantaneous signal loss also occurs to cause the carrier terminal to be out of phase, as in the above-described prior art.

Second, when the standby transmission channel malfunctions after the channel is switched from the active transmission channel to the standby transmission channel by the high speed switching circuit, signals on the standby transmission channel are eliminated. If the active transmission channel is restored in this condition, signal patterns therebetween do not coincide. As a result, the channel switch-back from the standby transmission channel to the active transmission channel cannot be carried out, and a channel malfunction condition continues.

Now, a preferred embodiment of a channel switching system of the present invention, without instantaneous signal loss, will be described.

Figure 3:
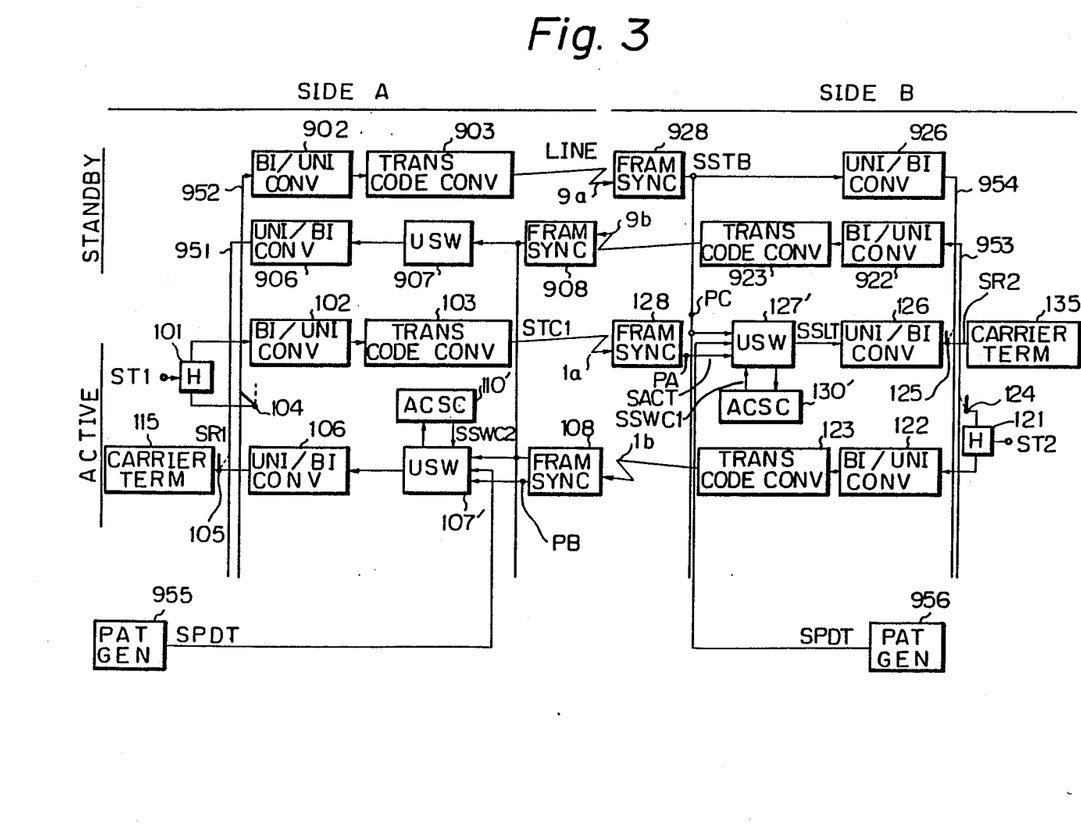
FIG. 3 is a block diagram of a digital microwave multiple radio communication system to which an embodiment of the present invention is applied.

FIG. 3 is a block diagram of a digital microwave multiple radio communication system in which the channel switching system of the embodiment is included. The digital microwave multiple radio communication system in FIG. 3 corresponds to the system in FIG. 1, but further includes pattern generators 955 and 956 respectively connected by the lines 107' and 127'. Also, the unipolar switching circuits 127' and 107' differ from the unipolar switching circuits 127 and 107 shown in FIGS. 1 and 2. Automatic channel switching circuits 130' and 110' also differ from the automatic channel switching circuits 130 and 110 shown in FIG. 1.

Figure 4:
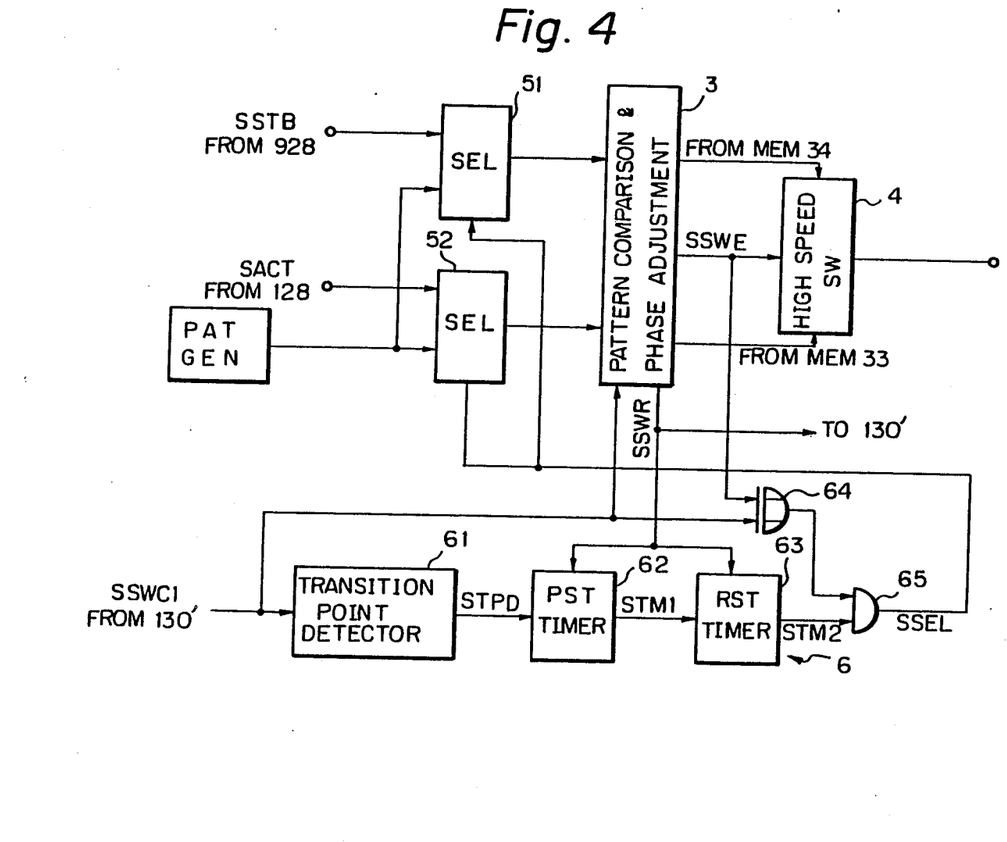
FIG. 4 is a circuit diagram of a unipolar switching circuit shown in FIG. 3.

FIG. 4 is a circuit diagram of the unipolar switching circuit 127' shown in FIG. 3. In FIG. 4, the unipolar switching circuit 127' includes selectors 51 and 52, and an input data selection control means 6 consisting of a transition point detector 61, timers 62 and 63, an exclusive OR gate 64, and an AND gate 65, in addition to the unipolar switching circuit 127 of the pattern comparison and phase adjustment circuit 3 and the high speed switch circuit 4, shown in FIG. 2. The pattern generator 956 commonly provided in side B is connected to the selectors 51 and 52 and supplies a special pattern data SPDT, for example all zeros or all ones, to the selectors 51 and 52. The standby signal SSTB from the frame synchronizer 928 is supplied to another terminal of the selector 51, and the active signal SACT from the frame synchronizer 128 is supplied to another terminal of the selector 52.

The pattern comparison and phase adjustment circuit 3 and the high speed switching circuit 4, per se, are identical to those described above with reference to FIG. 2.

Figure 5:
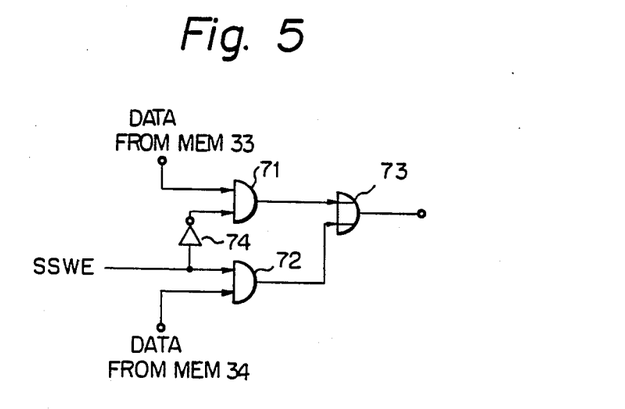
FIG. 5 is a circuit diagram of a high speed switch circuit show in FIG. 4.

FIG. 5 is a circuit diagram of the high speed switching circuit 4. The high speed switching circuit 4 includes AND gates 71 and 72, an OR gate 73, and an inverter 74. The high speed switching circuit 4 outputs the data from the memory 34 in the pattern comparison and phase adjustment circuit 4 in response to the logical "1" switching energizing signal SSWE.

The selectors 51 and 52 have the same circuit as the circuit shown in FIG. 5 for switching a no-loss signal.

The operation of the circuits shown in FIGS. 3 to 5 will be described with reference to FIGS. 6a to 6h. FIGS. 6a to 6h are time charts of signals in FIG. 4.

When a fault at the point PA is detected at a time t1, the automatic channel switching circuit 130' outputs the high level switch control signal SSWC1 to the unipolar switching circuit 127', more concretely, to the pattern comparison and phase adjustment circuit 3 as set forth above, and to the transition point detector 61. At this time an output of the timer 63 is low level, and accordingly, a selector selection signal SSEL from the AND gate 65 is low level. As a result, the selector 51 selects the standby signal SSTB, and the selector 52 also selects the active signal SACT. Upon receipt of the high level switching control signal SSWC1, the pattern comparison and phase adjustment circuit 3 starts the pattern comparison between the active signal SACT and the standby signal SSTB, and the phase adjustment of the standby signal SSTB with the active signal SACT, as shown FIG. 6b.

Figure 6A:
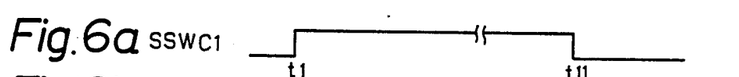
FIGS. 6a to 6h are timing charts illustrating the operation of the circuits of FIGS. 3 to 5.
Figure 6B:
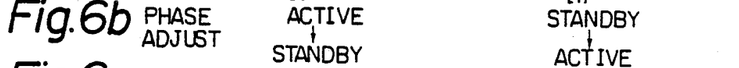
Figure 6C:
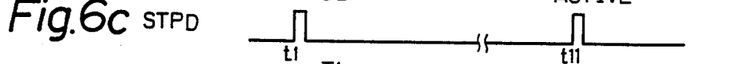
Figure 6D:
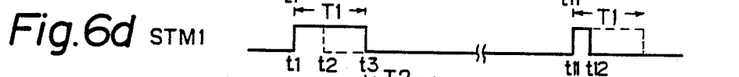

Simultaneously, the transition point detector 61 detects the rising edge of the switch control signal SSWC1, and outputs a transition point detection signal STPD having a short high level period, as shown in FIG. 6c. The transition point detection signal STPD is supplied to and starts the timer 62. The timer 62 outputs a high level timer signal STM1 by a period T1, as shown in FIG. 6d.

During the period T1, the pattern comparison and phase adjustment circuit 3 attempts an adjustment of a phase between the standby signal and the active signal. When the phase is adjusted at a time t2, the pattern comparison and phase adjustment circuit 3 outputs the low level switch energizing signal SSWE, as shown by a dotted line in FIG. 6f, to the high speed switch circuit 4, switching channels from the active transmission channel to the standby transmission channel by the high speed switch as shown in FIG. 5. This is called "synchronous mode" switching. The switch energizing signal SSWE is also supplied to the timer 62 so that the timer 62 is turned OFF to bring the timer signal STM1 to a low level, as shown by a dotted line in FIG. 6d. Since the output of the timer 63 is still low level, the selection signal SSEL from the AND gate 65 is still low level. Accordingly, the selection conditions at the selectors 51 and 52 are not changed.

Figure 6E:
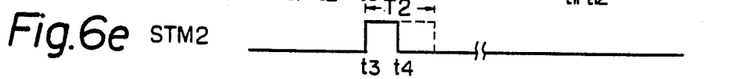
Figure 6F:
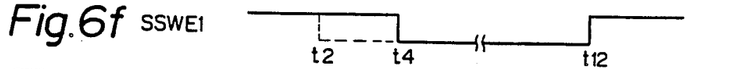

On the other hand, during the period T1, if a phase coincidence between the standby signal SSTB and the active signal SACT cannot be obtained, the timer 62 is terminated at a time t3, and subsequently the timer 63 is started. The timer 63 outputs the high level timer signal STM2 having a maximum period T2, as shown in FIG. 6e. The high level timer signal STM2 is supplied to the AND gate 65. The high level switch control signal SSWC1 and the low level switching energizing signal SSWE are supplied to the exclusive OR gate 64 outputting a high level signal therefrom. The AND gate 65 outputs the high level selection signal SSEL to the selectors 51 and 52. Subsequently, both selectors 51 and 52 select and output the special pattern data of all zeros or all ones from the pattern generator 956 to the pattern comparison and phase adjustment circuit 3. The same pattern data is supplied to the pattern comparison and phase adjustment circuit 3. The pattern comparison and phase adjustment can be carried out to obtain a compulsory coincidence for the same data. The pattern comparison and phase adjustment circuit 3 will soon output the high level switch, energizing signal SSWE, indicating the switch from the active signal SACT to the standby signal SSTB, and as shown in FIG. 6f, to the high speed switch circuit 4, at a time t4. Thus, a forcibly channel switching can be carried out by the high speed switch circuit 4. As a result, the channel switching without instantaneous signal loss is achieved.

Figure 6G:
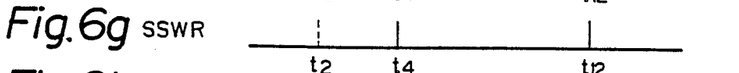

At the same time, the pattern comparison and phase adjustment circuit 3 outputs a switching response signal SSWR as shown in FIG. 6g to the automatic channel switching circuit 130' and a reset terminal of the timers 62 and 63. Upon receipt of the switching response signal SSWR, the automatic channel switching circuit 130' acknowledges a completion of the channel switching and maintains the switching control signal SSWC1 at a high level. Upon receipt of the switching response signal SSWR, the timer 63 is also terminated, bringing the timer signal STM2 to a low level, before lapse of the time T2. Consequently, the low level selection signal SSEL from the AND gate 65 is output to restore the selection condition at the selectors 51 and 52. As a result, the standby signal is output through the selector 51 the pattern comparison and phase adjustment circuit 3, and the high speed switch 4.

Figure 6H:
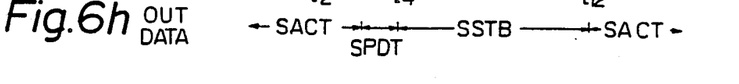

During the above operation, as shown in FIG. 6h, the data from the high speed switch circuit 4 is output as follows: the active signal SACT until the time t3; the pattern data SPDT between the times t3 and t4; and the standby signal SSTB after the time t4. But there is not signal loss.

When the active transmission channel is restored at a time t11, the fault detector (not shown) detects the recovery and again triggers the automatic channel switching circuit 130'. The automatic channel switching circuit 130' outputs the low level switching control signal SSWC1 to the unipolar switch circuit 127'. Upon receipt of the low level signal SSWC1, the pattern comparison and phase adjustment circuit 3 adjusts a phase of the active signal SACT with a phase of the standby signal SSTB. When a coincidence occurs therebetween at a time t12 during the time T1 of the timer 62, the pattern comparison and phase adjustment circuit 3 outputs the low level switching energizing signal SSWE to the high speed switch circuit 4, switching-back from the standby transmission channel to the active transmission channel. Simultaneously, the switching response signal SSWR as shown in FIG. 6g is output to reset the timers 62 and 63 and to notify the automatic channel switching circuit 130' of a switching completion.

Even if the coincidence cannot be obtained during the time T1, the channel switching is not carried out, and the standby signal SSTB is still output.

As mentioned above, if a device failure occurs, the channel switching to the standby channel is carried out by using the high speed switch, without instantaneous signal loss. When the device failure is eliminated, the channel switch-back to the active channel is also carried out by using the high speed switch, without instantaneous signal loss.

In both channel switchings, the active transmission channel to the standby transmission channel, or vice versa, even if the coincidence cannot be obtained after the time T2 of the timer 63 has lapsed, the channel switching by the high speed switch cannot be carried out. But, as in the prior art, the channel switching by using the bipolar switch, i.e., the mercury relay, can be carried out.

The pattern generator 956 can be easily realized. When the patterns are all zeros, the input terminals of the selectors 51 and 52 are grounded, and when the patterns are all ones, a constant voltage is supplied to the input terminals of the selectors 51 and 52. The pattern generator 956 can output a variety of pattern data.

The above embodiment carries out a compulsory channel switching during the time T2 after a lapse of the time T1, by using the function of the pattern comparison and phase adjustment circuit 3 and by adding the selectors 51 and 52 and the input data selecting means 6.

Many widely different embodiments of the present invention may be constructed without departing from the spirit and scope of the present invention. It should be understood that the present invention is not limited to the specific embodiments described in this specification, except as defined in the appended claims.

I claim:

1. A channel switching system for a data communication system including, a standby transmission channel transmitter at a second end, and an active transmission channel having an active receiver at the first end, containing the channel switching system and a fault detector for detecting a fault and a recovery of the active transmission channel, and an active transmitter at the second end, the standby transmitter at the second end being capable of transmitting a signal which is the same as that from the active transmitter at the second end, the fault and recovery detector detecting a fault or recovery of the active transmission channel in accordance with a signal output from the active or standby transmitter at the second end, said channel switching system comprising:

control means for generating a switching control signal in response to one of a fault and a recovery signal from said fault and recovery detecting means;

phase adjustment means, operatively connected to said control means, for receiving a signal from said active receiver and another signal from said standby receiver, for adjusting phase between both received signals in response to said switching control signal, and for outputing a switch energizing signal and two phase adjusted signals;

switch means, operatively connected to said phase adjustment means including a unipolar high speed switching circuit, for switching the two phase adjusted signals from said phase adjustment means in response to receiving said switch energizing signal; and switching means, operatively connected to said phase adjustment means, for switching signals sent from said another end and supplied to said phase adjustment means in response to receiving said switching control signal, said phase adjustment means adjusting a phase of one received signal to another phase of another received signal in response to receiving said switching control signal, said phase adjustment means outputting said switch energizing signal to said unipolar switching circuit when a phase coincidence is obtained before a predetemined time lapse from an output of said switching control signal so that said unipolar switching circuit outputs the signal phase adjusted by said phase adjustment means in response to receiving said switch energizing signal, said switching means energizing said unipolar switching circuit, when the phase coincidence is not obtained during said predetermined time, to output one signal of said phase adjusted signals in response to receiving said switch energizing signal.

2. A channel switching system according to claim 1, wherein said phase adjustment means includes a first memory means (33), a first memory control means (31) operatively connected to said first memory means and receiving said signal from said active receiver means, a second memory means (34), a second memory control means (32) operatively connected to said second memory means and receiving said signal from said standby receiver, and a pattern comparison means (35) operatively connected to said first and second memory control means, said pattern comparison means receiving data from said first and second memory means, comparing both said received data in response to reception of said switch control signal, controlling one of said first and second memory control means, defined by a signal level of said switch control signal, to output shifted data from said memory means corresponding to said controlled memory control means until both said data from said first and second memory means coincide during said predetermined time.

3. A channel switching system according to claim 2, wherein said phase adjustment means adjusts a phase of said standby signal with a phase of said active signal when said switching control signal is changed from one level to another level, and outputs said switch energizing signal indicating a selection of said standby signal to said unipolar switching means after a phase coincidence, or vice versa.

4. A channel switching system according to claim 3, wherein said unipolar switching means comprises a first AND gate (71) receiving said standby signal and an inverted switching control signal and a second AND gate (72) receiving said active signal and said switching control signal.

5. A channel switching system according to claim 4, wherein said compulsorily switching means supplies a same special pattern data to said phase adjustment means and moves said signals from said standby receiver and said active receiver means to said phase adjustment means when a phase coincidence is not obtained during said predetermined time, so that a phase coincidence for said same data is obtained to switch the signal at said unipolar switch means, said compulsorily switching means restoring said signals from said standby receiver and said active receiver means to be supplied to said phase adjustment means after completion of the switching at said unipolar switch means.

6. A channel switching system according to claim 5, wherein said compulsorily switching means comprises a first switching circuit (51) receiving said active signal and said special pattern data, a second switching circuit (52) receiving said standby signal and said special pattern data, and a selection control circuit (61 to 65), said selection control circuit controlling said first and second switch circuits to output said special pattern data from said first and second switching circuits when said predetermined time has elapsed and until said phase coincidence is obtained.

7. A channel switching system according to claim 6, wherein said first and second switching circuits comprise unipolar high speed switch circuits.

8. A channel switching system according to claim 7, wherein further comprises a pattern generator generating said special pattern data.

9. A channel switching system according to claim 8, wherein said pattern generator generates a constant voltage.

10. A channel switching system according to claim 1, further comprising a bipolar switch, said control means energizing said bipolar switch when a second predetermined time (T2) has elapsed after lapse of said predetermined time to output, through said bipolar switch, said standby signal when said active transmission channel is faulty, or said active signal when said active transmission channel is restored.

11. A channel switching system, for switching channels in a data communication system without instantaneous signal loss, the data communication system having an active transmission channel with an active transmitter, an active receiver and active signals, a standby transmission channel with a standby transmitter, a standby receiver and standby signals, and a fault detector connected to the active receiver for detection of both a fault and fault recovery of the active signals in the active transmission channel, said channel switching system comprising:

control means, operatively connected to the active receiver and the fault detector, for generating a switching control signal having predetermined levels responsive to detection by the fault detector;

phase adjustment means, operatively connected to said control means, receiving the active signals from the active receiver and the standby signals from the standby receiver, for adjusting a phase between the received active and standby signals responsive to the switching control signal, storing phase data corresponding to the received active and standby signals, providing outputs of the stored phase data and outputting a switch energizing signal when phase coincidence occurs between the received active and standby signals during a predetermined time after receiving the switching control signal;

high speed switch means, operatively connected to said phase adjustment means, for switching between the active and standby channels in accordance with the stored phase data, responsive to the switch energizing signal;

pattern generator means, operatively connected to the active receiver, for providing digital outputs as special pattern data corresponding to digital voltage levels; and switching means, operatively connected to said phase adjustment means, for switching between the active signals from the active receiver and the standby signals from the standby receiver responsive to the special pattern data, said switching means receiving and providing the special pattern data as one of all zeros and all ones to said phase adjustment means, initiating switching action between the active channel and the standby channel when the phase coincidence does not occur within the predetermined time.

12. A channel switching system according to claim 11, wherein said phase adjustment means comprises:

first memory means, operatively connected to receive active signal data from the active receiver, for storing and providing the active signal data responsive to a first write control signal;

first write controller means, operatively connected to said first memory means receiving the active signals from the active reciver, for providing the active signal data and the first write control signal responsive to a first shift signal;

second memory means, operatively connected to receive standby signal data from the standby receiver, for storing and providing the standby signal data responsive to a second write control signal;

second write controller means, operatively connected to said second memory means, for providing the standby signal data and the second write control signal responsive to a second shift signal; and pattern comparator means, operatively connected to said first and second memory means and said first and second write controller means and responsive to said switching control signal, for comparing the active and standby signal data from said first and second memory means, outputting the switch energizing signal when the compared data coincide and generating one of the first and second shift signals corresponding to one of the predetermined levels of the switching control signal when the compared data do not coincide, so that a bit of data is shifted from a corresponding one of said first and second memory means until the compared data coincide during the predetermined time.

13. A channel switching system according to claim 11, wherein said phase adjustment means comprises means for outputting a switching response signal, responsive to the output of the switch energizing signal.

14. A channel switching system according to claim 11, wherein said high speed switching means comprises:
first and second AND gates, receiving the active signal data and the standby signal data from said first and second memory means, receiving the switch energizing signal and providing corresponding first and second AND gate outputs; and
a third AND gate receiving the first and second AND gate outputs, providing the standby signal data when the switch energizing signal is a first predetermined value and providing the active signal data when the switch energizing signal is a second predetermined value.

15. A channel switching system according to claim 11, wherein said high speed switch means comprises a high-speed unipolar switch.

16. A ohannel switching system according to claim 13, wherein said switching means comprises:
first and second selector circuits, selectively receiving and providing the active signals from the active receiver, the standby signals from the standby receiver and the special pattern data in accordance with a selection signal; and
input data selection control means, operatively connected to receive the switching control signal, the switching response signal and the switch energizing signal, for generating the selection signal.

17. A channel switching system according to claim 16, wherein said input data selection control means comprises:
a transition point detector detecting rising and falling edges of the switching control signal to generate a transition point detection signal;
a first timer having a first predetermined time period, receiving the transition point detection signal to generate a first time signal responsive to the switching response signal;
a second timer having a second predetermined time period, receiving the first time signal to generate a second time signal responsive to the switching response signal;
an exclusive-OR gate receiving the switching control signal and the switch energizing signal to generate an exclusive-OR signal; and
an AND gate receiving the second time signal and the exculsive-OR signal to generate and output the selection signal.

18. A channel switching system according to claim 16, wherein said first and second selector circuits comprise high-speed unipolar switches.

* * * * *

UNITED STATES PATENT AND TRADEMARK OFFICE
CERTIFICATE OF CORRECTION

PATENT NO. : 4,797,903
DATED : January 10, 1989
INVENTOR(S) : Hideaki Itoh

It is certified that error appears in the above-identified patent and that said Letters Patent is hereby corrected as shown below:

Title page:

ABSTRACT:

Line 6, after "a" (second occurrence) insert --phase adjustment--;

Line 7, delete "phase adjustment".

COLUMN 5:

Line 9, "feeence" should be --reference--.

COLUMN 6:

Line 46, delete "14".

COLUMN 14:

Line 6, "ohannel" should be --channel--.

Signed and Sealed this

Eleventh Day of July, 1989

*Attest:*

DONALD J. QUIGG

*Attesting Officer*    Commissioner of Patents and Trademarks